UNITED STATES PATENT OFFICE.

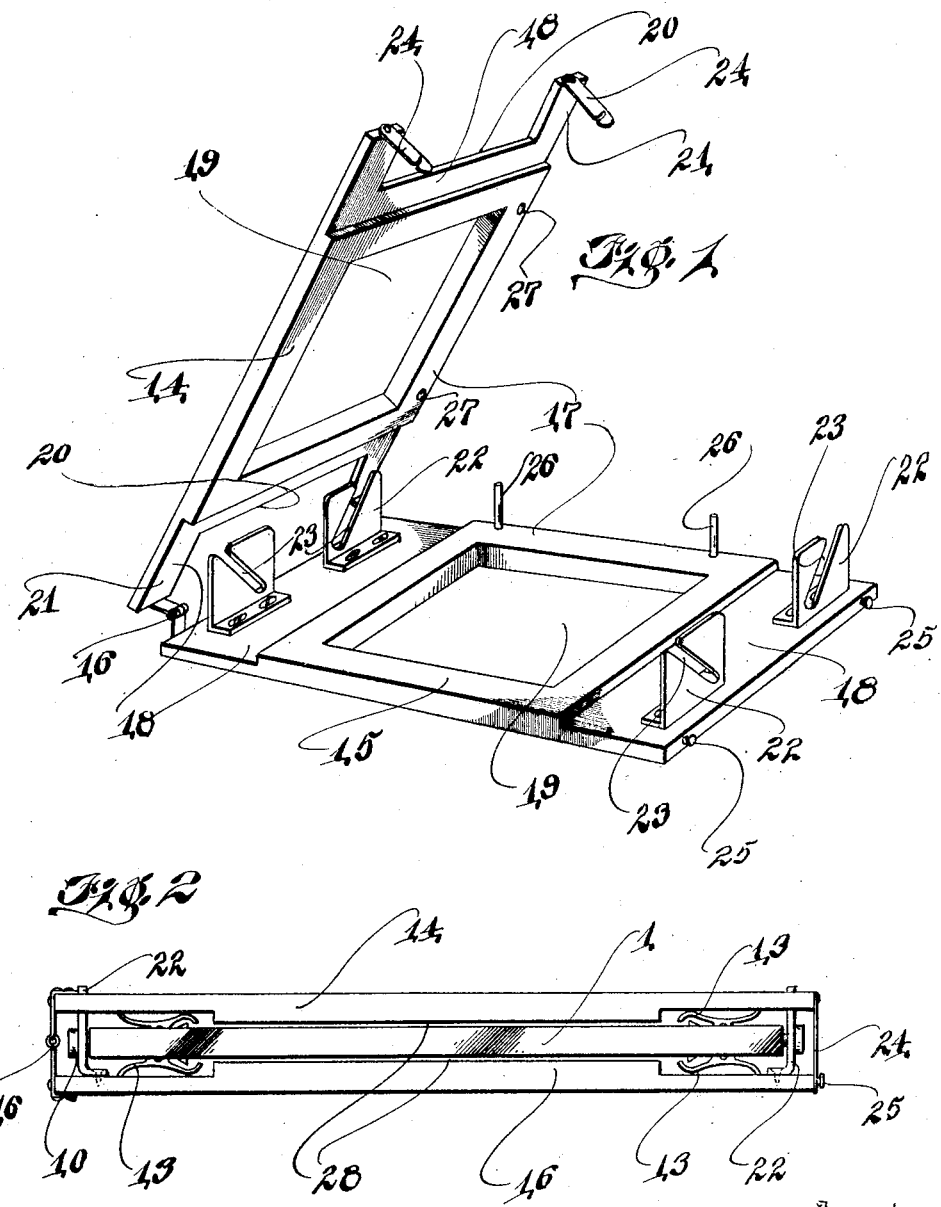

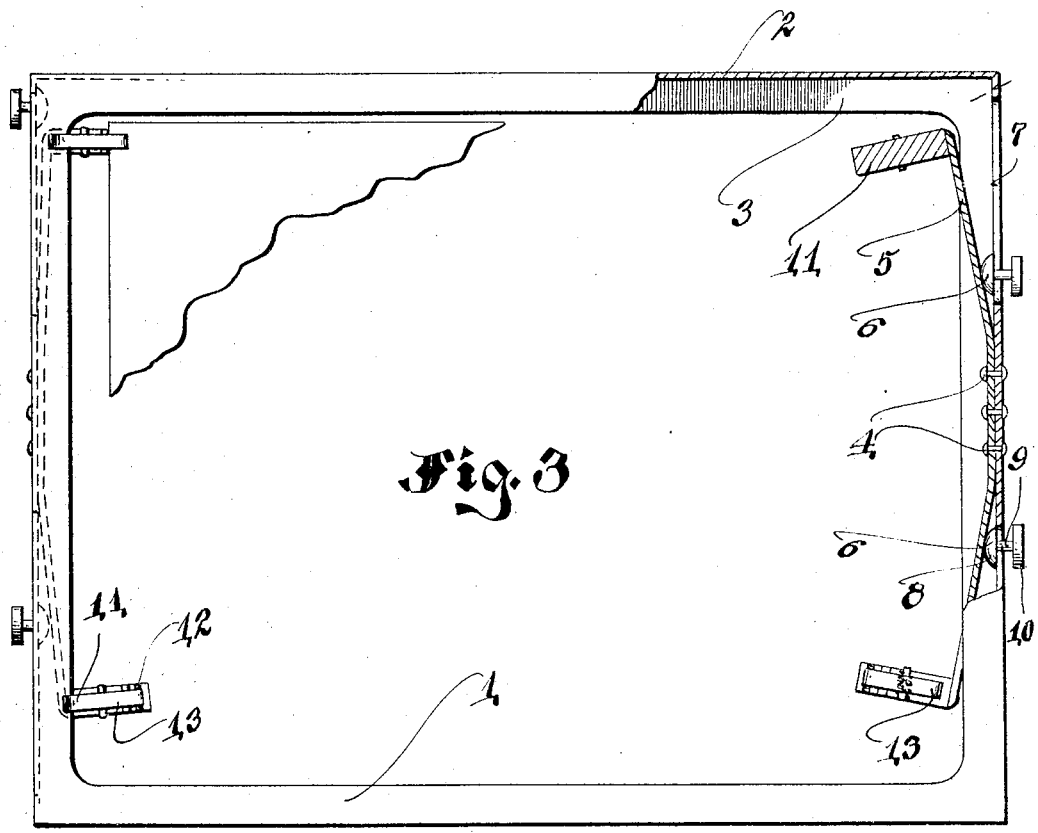
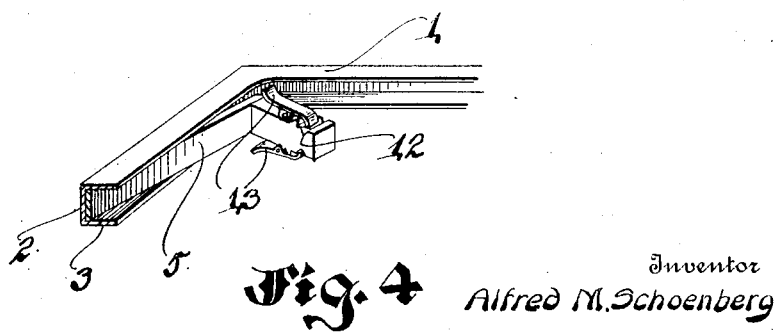

ALBERT M. SCHOENBERG, OF SPOKANE, WASHINGTON.

LOADING DEVICE FOR CUT-FILM FRAMES.

1,237,563.   Specification of Letters Patent.   Patented Aug. 21, 1917.

Application filed October 16, 1916. Serial No. 125,900.

*To all whom it may concern:*

Be it known that I, ALBERT M. SCHOENBERG, a citizen of the United States, residing at Spokane, in the county of Spokane and State of Washington, have invented certain new and useful Improvements in Loading Devices for Cut-Film Frames, of which the following is a specification.

My invention relates to improvements in loading devices for cut film frames, and the object of my invention is the provision of a device of this character especially designed for use in connection with my invention of a cut film frame filed October 16th 1916, Serial Number 125,899, which is the subject of a separate application for patent. No claim covering the distinctive construction of said film frame is included in this application.

My invention has as a further object the provision of a loading device which is of cheap, strong, and simple construction, and which will effectually perform in the most advantageous manner the several functions for which it is designed.

In the following detailed description of the device, recourse will be had to the accompanying drawings which include, besides the views of the loader, an illustration of the frame above referred to for the purpose of more clearly disclosing the invention. In said drawings—

Figure 1 is a perspective view of the complete loading device with its hinged top clamping member in open position.

Fig. 2 is a side elevation of the invention showing said top closed and with the film frame which it is adapted to accommodate mounted therein ready to receive the films.

Fig. 3 is a plan view of the film frame with a portion thereof broken away in order to show the film retaining and tensioning elements.

Fig. 4 is a detail view on an enlarged scale of one corner of the frame, a section of one of the tensioning members, and the film clips and film guides.

Before proceeding to describe in detail the immediate invention which is the subject of this application, I will first describe briefly the film frame.

The numeral 1 designates the rectangular frame which is preferably of metal, the sides and ends thereof being formed U-shaped in cross-section or of channel construction to insure strength and rigidity, and thus providing an outer wall 2 and the inwardly extended flange portions 3. Secured to said outer wall at opposite ends of the frame and by means of the rivets 4 are the flat spring tension members 5, said rivets securing the members at points intermediate of their ends so that their end portions may be freely extended under tension by proper adjustment of the buttons 6 which is one of the functions of my loader as will be hereinafter explained, said buttons being slidably mounted, in coöperative relation to said end portions of the spring members, in the longitudinal slots 7 in the outer wall 2 of the film frame.

As clearly shown in Fig. 3 these buttons have the spring engaging knobs 8, shanks 9, and finger gripping heads 10, the latter projecting outwardly from the outer face of the frame in order that they may be conveniently grasped for sliding adjustment of the buttons in the slots and, in connection with the loader when this device is employed, so as to provide a means for mechanical actuation of the buttons.

These spring tension members 5 normally extend parallel with and lie flat against the adjacent inner face of the outer wall 2 to which they are secured, and carry at either extremity inwardly extended central spring clip members 11 provided with notches 12 near their free ends and having mounted thereon at opposite sides companion hinged spring clips 13 adapted to engage said notches with their ends to tightly hold the films in place. It is to be noted that the rear or operating end of the spring controlled lever member 13′ of the clip is curved so as to project beyond the flanged portions of the frame, the purpose of which will be later apparent.

The loading device comprises the top and bottom rectangular clamping members 14 and 15 respectively, which are hinged together and spaced apart by the extended hinges 16. The top and bottom members are somewhat similar in form and construction each being provided with a rectangular raised centered portion 17 and depressed end portions 18, the portions 17 preferably having rectangular cut-out portions 19 extending therethrough.

The top clamping member 14 is further provided or formed with the cut-out portions 20 and in consequence thereof with the fingers 21 at each corner, the purpose of the cut-out portions being to provide proper clearance between the top clamping member and the upstanding metal adjusting members 22 when the top is closed down. These adjusting members 22 are secured to the depressed portions of the bottom clamping member 15, each having a diagonal or angular slot 23 adapted to receive the shank portion 9 of the buttons 6 of the film frame. Pivoted notched fastenings or latches 24 and studs 25 provide means for locking the members in closed position. Dowel pins 36 and registering holes 27 serve to retain the clamping members in accurate closed relation.

The purpose of this loader is to provide means for conveniently and accurately positioning the flexible photographic films in the heretofore described film frame, and the method of using the same will now be explained.

The film frame is first mounted upon the bottom member of the loader with the shanks 9 of the projecting adjusting buttons 6 of the frame 1 mounted for guidance in the corresponding angular or diagonal slots 23. Upon pressing the frame down snugly on the bottom clamping member 15 said slots 23 will serve to guide the adjusting buttons 6 to the innermost points in the frame slots 7, thus causing the spring engaging knobs 8 of the buttons to engage the tension spring members 5 to press their free end portions inwardly of the frame 1.

The top clamping member 14 is then closed down and secured by means of the latches 24. The film holding spring clips 13 being thereby disposed in the spaces provided for their reception by reason of the depressed portions 18 of the top and bottom clamping members and the fingers 21 of the former, their projecting lever manipulating ends 13' will contact with the adjacent faces of the top and bottom members so as to open the jaws of the clips, all as clearly illustrated in Fig. 2.

The films may then be inserted edgewise in the two spaces 28 formed between the raised portions 17 of the clamping members and the film frame until their corners are properly positioned for engagement by the jaws of the clips, the guides 29 of the spring clip members 11 serving to facilitate the accurate disposition of the films.

It is obvious that raising of the top member of the loader and removal of the film frame will allow the jaws of the clips to clamp shut and grip the films to secure them in place, while the same operation of removal will operate to guide the buttons 6 in the loader slots 23 and the movement thereby imparted to the buttons will serve to slide the same outwardly in their respective slots 7 of the frame, which will in turn release the tension members 5 of the frame to properly stretch and flatten out the films and retain them in a taut, unwrinkled state free from curl.

Having described my invention, I claim:—

1. The combination with a film holding frame, of a photographic film frame loading device comprising two relatively movable clamping members adapted to receive therebetween said film holding frame, and when in clamped or closed relation to provide spacing between said clamping members and said frame to admit therein edgewise films or the like and to guide the same into proper position to be secured in the film holding frame.

2. The combination with a film holding frame, of a photographic film frame loading device comprising two relatively movable clamping members each formed with a raised centered portion and depressed adjacent end portions, said members being adapted to receive therebetween said film holding frame, and when clamped together to provide spacing between their respective raised portions and said frame to admit of insertion therein edgewise of films or the like and to guide the same into proper position to be secured in the film holding frame.

3. The combination with a film holder comprising a frame, spring tension members secured to the opposite ends of said frame, a photographic film frame loading device comprising two relatively movable clamping members each formed with a raised centered portion and adjacent depressed end portions, said members being adapted to receive therebetween the film holding frame provided with companion film clamping or retaining devices each provided with a portion projecting above and below said frame, said devices being adapted to be disposed between the depressed end portions of the loading device clamping members when the latter are in clamped relation; and suitable spacing formed between said raised centered portions and said frame when said clamping members are closed to provide for and allow insertion therein edgewise of films or the like, and to guide the same in position for engagement by said retaining devices.

4. The combination with a film holder comprising a frame, spring tension members secured to opposite ends of the frame, film retaining devices carried by said tension members, and adjusting means therefor extending beyond the ends of the frame, of a photographic film frame loading device comprising two relatively movable clamping members adapted to receive therebetween the film holding frame provided with film retaining devices and adjustable tensioning members; means for operating said retaining devices and upstanding slotted members carried by one of said clamping members for automatically adjusting said tensioning members by relative movements of the clamping members, and spacing formed between the inner faces of the clamping members and the film holding frame to admit of insertion therein edgewise of films or the like to be secured in the film holding frame by the retaining devices.

In testimony whereof I affix my signature.

ALBERT M. SCHOENBERG.

Copies of this patent may be obtained for five cents each, by addressing the "Commissioner of Patents, Washington, D. C."